(12) United States Patent
Meng et al.

(10) Patent No.: US 10,404,849 B2
(45) Date of Patent: Sep. 3, 2019

(54) LAUNCHING A DESIGNATED APPLICATION USING A SET OF SIGNALS

(71) Applicant: Alibaba Group Holding Limited, George Town (KY)

(72) Inventors: Chaofeng Meng, Hangzhou (CN); Xiaowei Chen, Hangzhou (CN); Lingyun Chen, Hangzhou (CN); Feng Zhu, Hangzhou (CN); Ji Xu, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 15/195,902

(22) Filed: Jun. 28, 2016

(65) Prior Publication Data

US 2016/0309016 A1 Oct. 20, 2016

Related U.S. Application Data

(63) Continuation of application No. 14/074,474, filed on Nov. 7, 2013, now Pat. No. 9,438,720.

(30) Foreign Application Priority Data

Nov. 8, 2012 (CN) .......................... 2012 1 0444200

(51) Int. Cl.
*H04M 1/725* (2006.01)
*H04M 1/275* (2006.01)
*H04M 3/493* (2006.01)

(52) U.S. Cl.
CPC ....... *H04M 1/72563* (2013.01); *H04M 1/275* (2013.01); *H04M 1/72583* (2013.01);
(Continued)

(58) Field of Classification Search
CPC ............ H04M 1/275; H04M 1/72563; H04M 1/72583; H04M 2250/22; H04M 2250/56; H04M 3/493
See application file for complete search history.

(56) References Cited

U.S. PATENT DOCUMENTS 6,009,338 A 12/1999 Iwata et al.
6,154,465 A 11/2000 Pickett
(Continued)

FOREIGN PATENT DOCUMENTS

EP 0804009 A2 10/1997
EP 2244451 A1 10/2010
(Continued)

OTHER PUBLICATIONS

Nurminen et al., Parallel Data Transfer with Voice Calls for Energy-Efficient Mobile Services, ICST Institute for Computer Science, Social Informatics and Telecommunications Engineering, 2009, pp. 87-100.

*Primary Examiner* — Frantz Bataille
(74) *Attorney, Agent, or Firm* — Van Pelt, Yi & James LLP

(57) ABSTRACT

Exchanging information via a designated application includes establishing a voice communication link with a client device; sending a launch command associated with a designated application to the client device via the voice communication link, wherein upon receiving the launch command, the client device is caused to launch the designated application; and exchanging information with the client device through the designated application.

19 Claims, 7 Drawing Sheets

(52) U.S. Cl.
CPC ........ *H04M 3/493* (2013.01); *H04M 2250/22* (2013.01); *H04M 2250/56* (2013.01)

(56) References Cited

U.S. PATENT DOCUMENTS

| | | |
|---|---|---|
| 6,333,973 B1 | 12/2001 | Smith et al. |
| 6,868,140 B2 | 3/2005 | Myers |
| 7,003,085 B1 | 2/2006 | Lashley et al. |
| 7,054,819 B1 | 5/2006 | Loveland |
| 7,092,738 B2 | 8/2006 | Creamer et al. |
| 8,619,951 B2 | 12/2013 | Johansen et al. |
| 2001/0007589 A1* | 7/2001 | Uppaluru ............ H04M 3/5191 379/211.02 |
| 2001/0040892 A1 | 11/2001 | Spencer |
| 2005/0070262 A1* | 3/2005 | Weigand ................. H04L 29/06 455/418 |
| 2006/0093100 A1* | 5/2006 | Carlson ............ H04M 1/72525 379/88.16 |
| 2007/0082708 A1 | 4/2007 | Griffin |
| 2008/0163201 A1* | 7/2008 | Jogand-Coulomb ... G06F 9/441 717/178 |
| 2008/0214158 A1* | 9/2008 | Osborne ........... H04M 1/72525 455/414.1 |
| 2010/0136921 A1* | 6/2010 | Pedrazzi ................ H04H 20/61 455/68 |
| 2011/0286586 A1* | 11/2011 | Saylor .................. H04M 3/493 379/88.13 |
| 2012/0296686 A1 | 11/2012 | Fugman et al. |

FOREIGN PATENT DOCUMENTS

| | | |
|---|---|---|
| JP | H09214624 | 8/1997 |
| JP | 2007104455 | 4/2007 |
| JP | 2010244273 | 10/2010 |
| WO | 2008065662 A2 | 6/2008 |
| WO | 2011133824 A1 | 10/2011 |

* cited by examiner

LAUNCHING A DESIGNATED APPLICATION USING A SET OF SIGNALS

CROSS REFERENCE TO OTHER APPLICATIONS

This application is a continuation of co-pending U.S. patent application Ser. No. 14/074,474, entitled EXCHANGING INFORMATION VIA A DESIGNATED APPLICATION filed Nov. 7, 2013, which claims priority to People's Republic of China Patent Application No. 201210444200.7 entitled A METHOD AND DEVICE FOR EXCHANGING INFORMATION IN BUSINESS PROCESSES, filed Nov. 8, 2012 both of which are incorporated herein by reference for all purposes.

FIELD OF THE INVENTION

The present application relates to the field of communication technology. In particular, it relates to techniques for exchanging information via a voice communication link.

BACKGROUND OF THE INVENTION

Conventionally, when a user wishes to contact a business, he or she may call a business server telephone number associated with the business. Once the user calls the business server telephone number, a voice communication link may be established with the business server, and the user may begin to exchange information with the business server using the voice communication link.

For example, when a user wishes to reserve a room of a certain hotel, he or she may use a mobile terminal (or other telephone terminal) to dial the telephone number of a hotel server associated with the hotel. After the dialed telephone number is reached, a voice communication link may be established between the user's mobile terminal and the hotel server. FIG. 1 is a flow diagram showing an example conventional process by which the mobile terminal may exchange information with the hotel server using the voice communication link. In example process 100, the user of the mobile terminal attempts to make a room reservation at a hotel associated with the server the user used the mobile terminal to call.

At 102, after a voice communication link is established, the hotel server plays a first audio recording. The first audio recording may include a message such as "For a self-help menu, please press 1. For help from one of our representatives, please press 2." The purpose of playing the audio recording is to prompt the user to select the service he or she needs via inputting values using a keypad associated with the mobile terminal.

At 104, the user presses a key on the mobile terminal keypad in response to the first audio recording. Assuming that the user wishes to use the self-help menu feature, he presses the number "1" key on the mobile terminal keypad. The mobile terminal sends a voice pulse signal (e.g., which includes dual-tone multi-frequency signals) corresponding to the number "1" to the hotel server.

At 106, after the hotel server analyzes the voice pulse signal to determine that the number "1" key was entered by the user at the mobile terminal, the hotel server determines that the user has selected the self-help menu service. As a result, the hotel server plays a second audio recording that includes the following message: "Please enter your identification number; use the '#' key when you are done."

At 108, the user enters his or her identification number via the mobile terminal keypad. The mobile terminal sends to the hotel server a voice pulse signal corresponding to each number of the identification number entered by the user.

At 110, the hotel server analyzes each voice pulse signal that it receives to obtain the corresponding number and saves the obtained series of numbers as the user's identification number. For example, the hotel server may save a number corresponding to each voice pulse signal that it receives from the mobile terminal until it receives a voice pulse signal that the hotel server identifies as being associated with the "#" key, at which point the hotel server determines that all the currently saved numbers form the completed identification number entered by the user. Subsequently, the hotel server may play an audio recording that includes the following message: "Your identification number is ABCDE. Please press 1 to confirm; press 0 to re-enter," where each character of "ABCDE" represents a saved number corresponding to the number entered by the user at the mobile terminal. Put another way, after determining that the voice pulse signal associated with the "#" key has been received, the hotel server replays the stored user-entered identification number in audio form so that the user may confirm whether he had correctly entered the identification number.

At 112, the user presses a key on the mobile terminal keypad associated with confirming the previously entered user identification number. For example, the audio message played back by the hotel server that included the audio form of the identification number previously entered by the user may also include a message that asks the user to either confirm the previously entered user identification number by pressing the "1" key of the mobile terminal keypad or inform the hotel server that the user would like to re-enter the user identification number by pressing the "2" key. In the example, assume that the user wishes to confirm that the previously entered user identification number was correct by pressing the "1" key of the mobile terminal keypad. The mobile terminal sends a voice pulse signal corresponding to the number "1" to the hotel server.

At 114, the hotel server analyzes the voice pulse signal to obtain the number "1" and based on the analysis, determines that the user has confirmed the user identification number he or she had entered. Once the hotel server determines that the user had confirmed the previously entered user identification number, the hotel server may perform subsequent steps involved in allowing the user to reserve a hotel room with the hotel. Example subsequent steps may include the hotel server prompting for the user to enter a credit card number using another audio recording, similar to those described above. For example, the hotel server may wish to acquire the user's credit card number so that the hotel server may charge a deposit for the reserved room.

As can be seen in the process shown in FIG. 1, in a conventional process, when a user exchanges information with a business server using a voice communication link, he or she is limited to sending voice pulse signals representing corresponding numbers to the business server via a mobile terminal keypad. The business server is also limited to prompting the user to proceed in audio form. Such an information exchange mode is relatively restricted and inefficient. In particular, when the user incorrectly enters a series of values into the mobile terminal keypad (e.g., his or her identification number or credit card number), he or she needs to re-enter the entire identification value or (or credit card number) string, which is inefficient.

BRIEF DESCRIPTION OF THE DRAWINGS

Various embodiments of the invention are disclosed in the following detailed description and the accompanying drawings.

DETAILED DESCRIPTION

Figure 1:
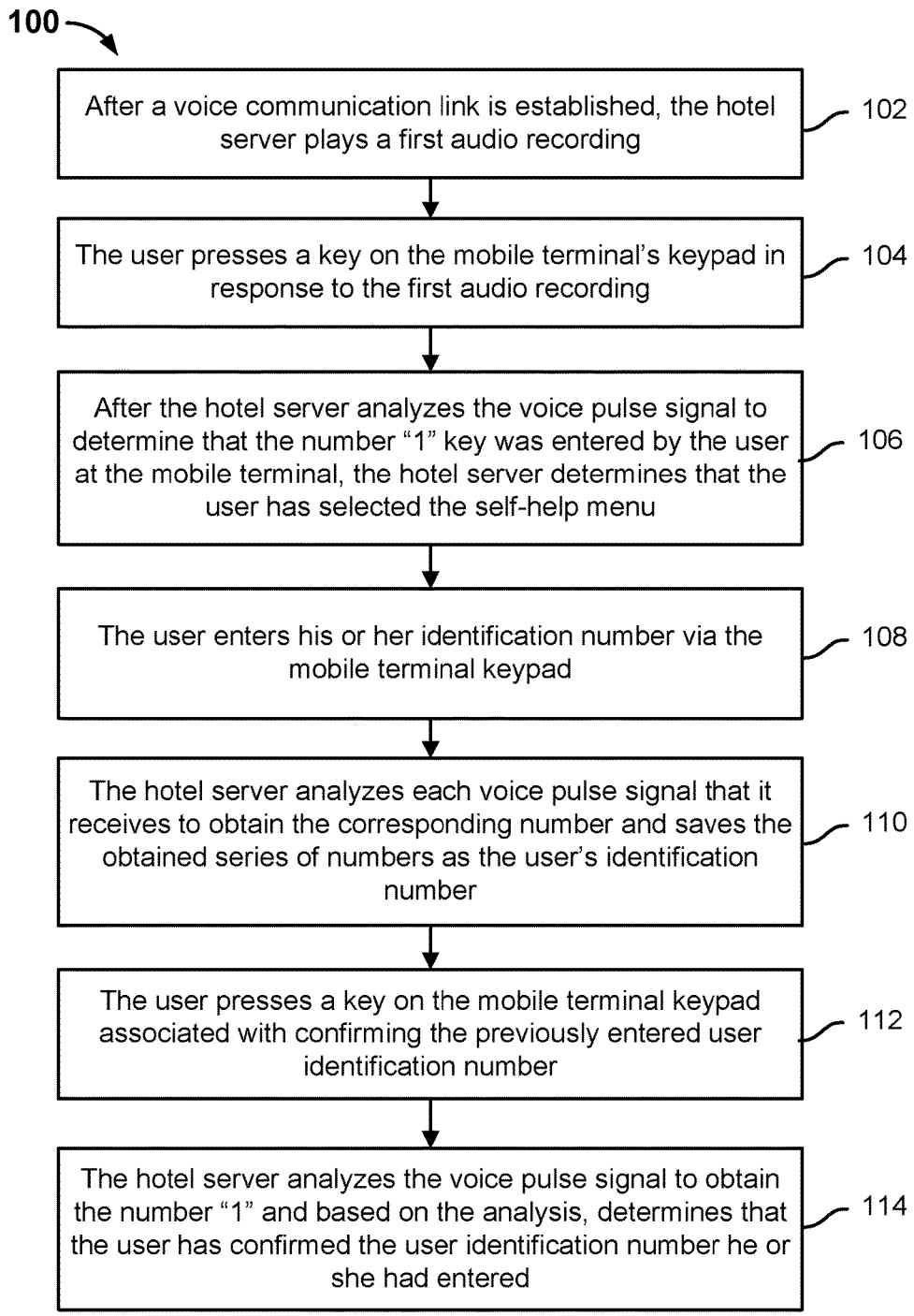
FIG. 1 is a flow diagram showing an example conventional process by which the mobile terminal may exchange information with the hotel server using the voice communication link.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of exchanging information via a designated application are described herein. One or more designated applications are running on a client device. For example, each designated application is associated with a particular business service (e.g., making a room reservation, making an appointment). Each such designated application is associated with a corresponding launch command. A user using the client device may initiate a request to a business server by calling a telephone number associated with the business server. Once a voice communication link has been established between the client device and the business server, the business server is configured to send a launch command back to the client device. An example of a voice communication link is a phone connection. The client device is configured to analyze the launch command and use the launch command to cause a designated application to launch at the client device. After the designated application has been launched, a user may input information into the user interface of the launched designated application. The information input into the user interface of the launched designated application is to be sent (e.g., over one or more of the established voice communication link and a data network) to the business network. Similarly, the business server may send more information to be displayed at the user interface of the launched designated application.

Figure 2:
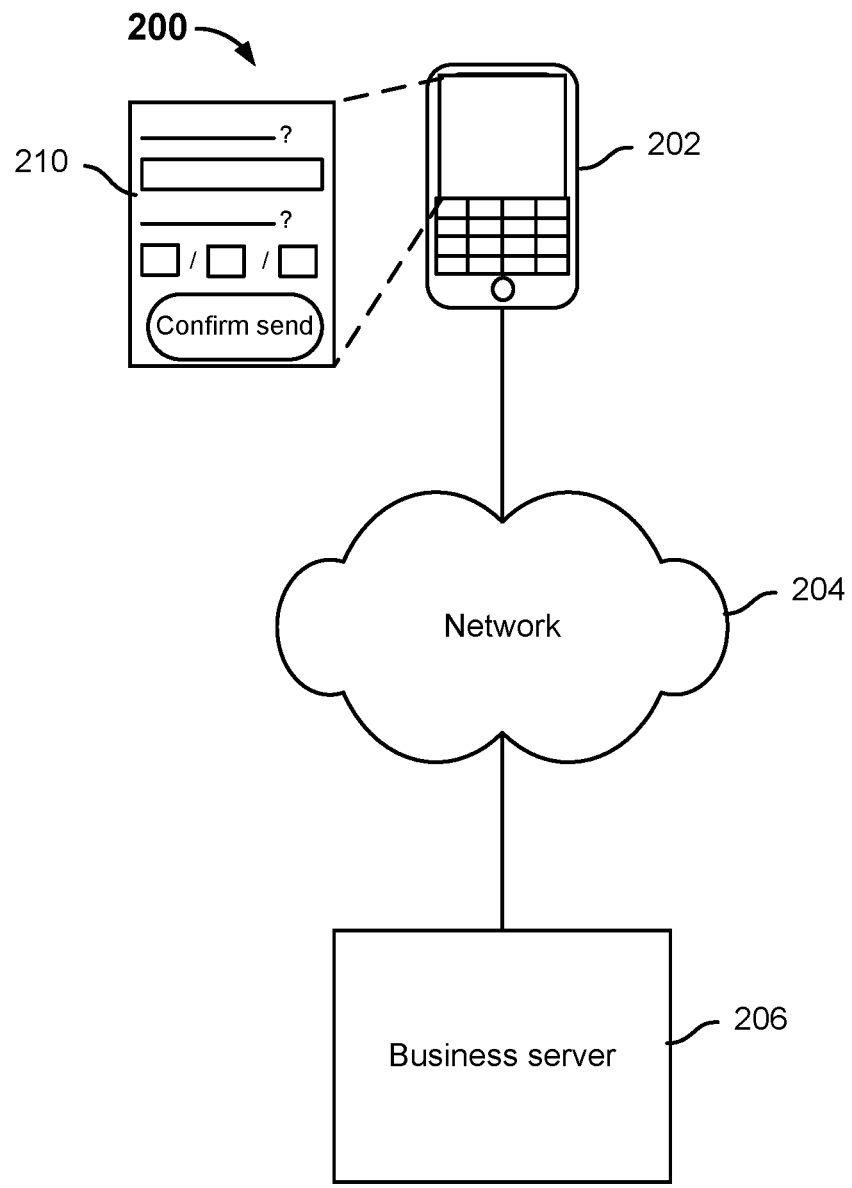
FIG. 2 is a diagram showing an embodiment of a system for information exchange.

FIG. 2 is a diagram showing an embodiment of a system for information exchange. In the example, system 200 includes client device 202, network 204, and business server 206. Network 204 includes high-speed data networks and/or telecommunication networks. Client device 202 and business server 206 communicate over at least network 204.

Client device 202 is configured to include telephone functionalities. Client device 202 is configured to include a keypad and/or a keyboard. In various embodiments, client device 202 is configured to include an input interface (e.g., a touchscreen). The keypad and/or keyboard included in client device 202 may be hardware-based (e.g., a physical keyboard) and/or software-based (e.g., a virtual keypad or keyboard may appear as buttons on a touchscreen). Examples of client device 202 include a mobile device, a smart phone, a tablet device, and/or any other type of computing device. One or more designated applications are running on client device 202, each of which corresponds to a particular business service. Example applications correspond to business services such as making a hotel room reservation, making a restaurant reservation, setting up an appointment, contacting customer service, and making a financial transaction.

Business server 206 is configured to process requests for one or more business services. Examples of business services include making a hotel room reservation, making a restaurant reservation, setting up an appointment, contacting customer service, and making a financial transaction. Server applications implementing request processing functions are configured to operate on business server 206. In some embodiments, each business service associated with business server 206 is associated with one or more telephone numbers. A user who wishes to make a request for a business service (e.g., make a hotel room reservation) can dial a telephone number associated with the business service using (e.g., the keypad or keyboard) client device 202. The telephone call will be routed to business server 206 and a voice communication link will be established between client device 202 and business server 206. The voice communication link may be established as a phone connection, for example. After the voice communication link is established, business server 206 is configured to send a launch command to client device 202. The launch command corresponds to a particular designated application associated with the requested business service that is running on client device 202. A launch command may comprise any preset set of message(s), preset set of voice pulse signal(s), preset set of values, or any other type of preset communication data that can be transmitted over the voice communication link and is also configured to be interpreted by client device 202 to trigger the launch of the launch command's corresponding designated application. In some embodiments, a software (e.g., an application) running on client device 202 waits for the launch command from a business server such as business server 206, interprets the launch command (e.g., by determining a set of values from the launch command), and launches a designated application associated with the interpreted launch command. In some embodiments, the designated application comprises the same application that received and interpreted the launch command. In some embodiments, the designated application comprises a different, separate application from the application that received and interpreted the launch command.

After the designated application corresponding to the launch command is launched at client device 202, the user may then be prompted for information by the user interface of the launched designated application. In the example, user interface 210 of a designated application that has launched at client device 202 shows prompts and corresponding input areas. For example, the prompts may appear as text at the user interface. The user may similarly input the solicited information into (e.g., appropriate input areas of) the user interface of the launched designated application to complete the request. The information input into the user interface of the launched designated application may be sent from client device 202 to business server 206 in response to a trigger (e.g., a user selection of a "Confirm send" control associated with the user interface of the launched designated application). In some embodiments, additional information to be displayed at (e.g., the user interface of the launched designated application) of client device 202 may also be sent from business server 206 to client device 202. In some embodiments, the information exchanged between client device 202 and business server 206 is transferred over one or both of the voice communication link and network 204.

In some embodiments, the launch command is sent by business server 206 as one or more signals. For example, business server 206 may include a special mechanism that is configured to generate signals to be sent to client device 202. In some embodiments, the special mechanism may comprise a software that is configured to generate dual-tone multi-frequency signals associated with the values of a launch command. For example, each of client device 202 and business server 206 is configured to store data indicating which dual-tone multi-frequency signals correspond to which values. For example, each of client device 202 and business server 206 is configured to store dual-tone multi-frequencies corresponding to, but not limited to, the values: "0," "1," "2," "3" "4," "5" "6," "7," "8," "9," "*" "#" "A," "B," "C," and "D." Client device 202 (and/or a software running on client device 202) may be configured to use the stored data to determine a set of values associated with a launch command from the one or more signals received from business server 206. In some embodiments, the special mechanism may comprise a predetermined translation technique that enables business server 206 to translate characters (e.g., alphanumeric characters) associated with the launch command into audio signals that can be carried over the voice communication link. For example, client device 202 may also be configured to store the predetermined translation technique (e.g., an audio to text converter) to enable it to translate the signals it receives from business server 206 into a set of values (e.g., alphanumeric characters) associated with a launch command.

Figure 3:
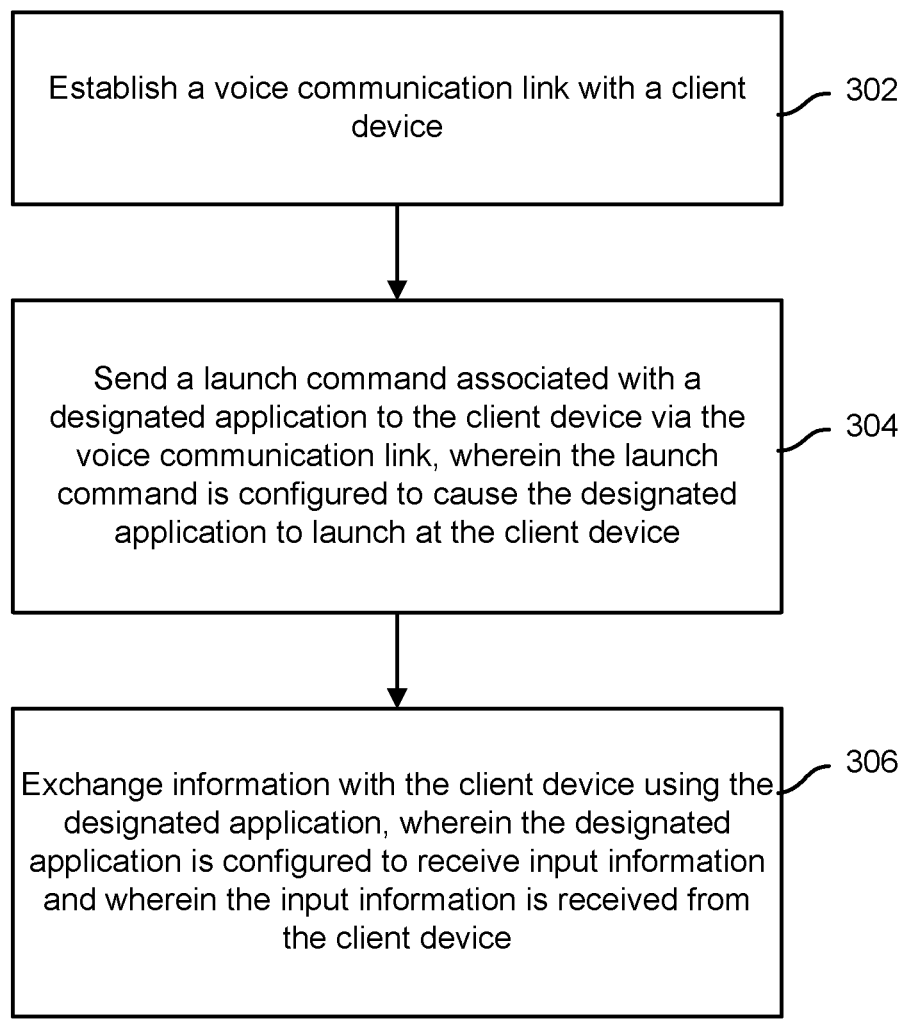
FIG. 3 is a flow diagram showing an embodiment of a process for exchanging information with a client device.

FIG. 3 is a flow diagram showing an embodiment of a process for exchanging information with a client device. In some embodiments, process 300 is implemented at business server 206 of FIG. 2.

At 302, a voice communication link is established with a client device. A user using the client device may initiate the voice communication link, in some embodiments, by using a telephone functionality running on the device to call a telephone number associated with the business server. Once the telephone call is received by the business server, the business server may establish a voice communication link with the client device using a known technique.

For example, assume that the business server is associated with a hotel's reservation services (the business server is also referred to as the hotel server in this example) and that the user using the client device wishes to call the telephone number associated with the hotel server to make a room reservation. To reach the hotel sever, the user may use a client device such as a mobile device, for example, to dial the telephone number of the hotel server and establish a communication link with the hotel server.

At 304, a launch command associated with a designated application is sent to the client device via the voice communication link, wherein the launch command is configured to cause the designated application to launch at the client device.

One or more designated applications may be executing at the client device. For example, the designated applications may have been installed on the client device prior to the voice communication link being established at 302. Each designated application may be associated with a different business service. Each designated application may also be associated with a different preset launch command (e.g., the launch command comprises a set or a series of values). Data that associates each designated application with its corresponding launch command may be stored at the business server and the client device.

In some embodiments, a launch command is sent as one or more signals. In some embodiments, the launch command is generated using a special mechanism (e.g., hardware and/or software) associated with the business server. For example, the signals may comprise dual-tone multi-frequency signals. A dual-tone multi-frequency signal comprises a tone for each of two frequencies and different combinations of the two frequencies correspond to different values (e.g., "1," "2," "3," and so forth) on a keypad. In another example, the signals may comprise audio signals. The audio signals may encode or represent one or more alphanumeric characters. Prior to sending the audio signals to the client device, the audio signals may be translated (e.g., decoded) by the business server based on a designated translation technique that is also known to the client device.

Therefore, after the client device establishes a voice communication link with the business server, the business server sends back to the client device the launch command using the voice communication link corresponding to a designated application associated with a business service of the business server.

Returning to the above example of exchanging information with a hotel server, after the hotel server has established a voice communication link with the terminal, the hotel server sends a launch command corresponding to a designated application associated with the hotel server back to the client device. The designated application is an application associated with a room reservation business service. In some embodiments, over the voice communication link, the hotel server sends back to the client device the launch command as a series of preset voice pulse signals, such as the dual-tone multi-frequency signals that correspond to respective values. Alternatively, the hotel server may send the launch command as audio signals over the voice communication link and where such audio signals may have been translated from characters according to a designated translation technique known to the client device.

After the client device receives the launch command that corresponds to the designated application and that was sent back by the business server, the client device (and/or a software running on the client device) will analyze the launch command (e.g., comprising one or more signals) to determine a set of values associated with the launch command. In some embodiments, the client device will analyze the received launch command based on a predetermined analysis technique (e.g., associated with a format of the launch command). In some embodiments, the client device will analyze the launch command through a special mechanism (e.g., a software) that can interpret, translate, and/or decode the launch command into a set of values (or symbols). For example, if the launch command were in the format of dual-tone multi-frequency signals, then the client device can use stored data indicating which dual-tone multi-frequency signals correspond to which values to determine the set of values of the launch command. In another example, if the launch command were in the format of audio signals, then the client device can use stored data associated with a predetermined translation technique to determine the set of values.

The set of values determined from the signals associated with the launch command is then looked up in the stored data that associates each designated application with its corresponding launch command (e.g., where each launch command is associated with a set of values) to find the designated application that corresponds to the determined set of values.

Once the designated application that corresponds to the determined set of values is found, the designated application is launched. In some embodiments, launching the designated application includes opening the designated application, running the designated application, and/or presenting a user interface of the designated application at the client device.

Returning to the above example of exchanging information with a hotel server, assume that the data stored at the client device indicates a correspondence between a launch command including the series of numbers of "1," "2," and "3" with a designated application corresponding to the room reservation business service. If the launch command were sent as dual-tone multi-frequency signals, then a special mechanism associated with the business server may interpret the launch command into a series of values and look up in the stored data a designated application that corresponds to the determined series of values. For example, a launch command received from the hotel server is interpreted to correspond to the series of values of "1," "2," and "3" based on stored data indicating which dual-tone multi-frequency signals correspond to which values. Then the stored data associating various launch commands to their respective designated applications is used to determine that the series of values of "1," "2," and "3" corresponds to the designated application associated with the room reservation business service. Once the designated application associated with the room reservation business service has been determined, the client device can launch that designated application.

At 306, information is exchanged with the client device using the designated application, wherein the designated application is configured to receive input information and the input information is received from the client device.

After the client device has launched the designated application as described above, the user of the client device may subsequently exchange information with the business server via the designated application. In various embodiments, the launched designated application includes a user interface with which the user of the client device may interact. For example, instead of the business server needing to play audio recordings to prompt the user of the client device for information, the user interface of the designated application may present text, characters, fields, and forms, for example, to prompt the user to submit information through the user interface. For example, the user interface may include input areas in which the user may enter alphanumeric characters (e.g., using the keypad and/or general keyboard of the client device) and/or other elements with which the user may make selections. Examples of information that may be solicited from the user using the designated application may include identifying information associated with the user (e.g., a username, a user identification number), credit card information, and/or other information required by the business service. In various embodiments, the user interface includes a control such that in response to a user selection of the control, the information input by the user into the user interface is sent to the business server. For example, the control may comprise a "Submit" or "Confirm Send" button.

The information input into the launched designated application may be sent to the business server using either the first or second embodiments described below:

In a first embodiment, the information input into the launched designated application may be sent to the business server over the voice communication link. For example, this embodiment may be used in the event that the data network is not available or at least not concurrently available with the voice communication link. For example, the client device may translate the information input into the launched designated application into signals (e.g., dual-tone multi-frequency signals or audio signals) and send the signals over the voice communication link to the business server. The business server may analyze the received signals based on their associated format to determine the information input by the user into the launched designated application.

Returning to the above example of exchanging information with a hotel server, once the designed application corresponding to the room reservation business service is launched, the user can enter the information that is solicited by the user interface of the designated application. Such information may include one or more of, for example, a user identification number, a username, a check-in time, and other such information. After the user had entered all the requisite information, he selected a "Confirm Send" button on the application user interface. The client device can then take the information entered by the user and translate it into signals using a designated translation technique (e.g., a text to audio converter), for example. The client device sends these signals via the voice communication link to the hotel server. The hotel server may analyze the information input by the user using an analysis associated with a format associated with the signals to determine the values of the user input information and complete the room reservation transaction based on the determined values of the user input information.

In a second embodiment, the information input into the launched designated application may be sent to the business server over a data network. In some embodiments, in order to reduce the expenditure of resources associated with maintaining the voice communication link established with the business server, the client device can end the voice communication link with the business server when it switches to exchanging information with the business server via the designated application using the data network.

Returning to the above example of exchanging information with a hotel server, after the client device launches the application corresponding to the room reservation business service, the client device ends the voice communication link with the business server. The user can enter his user identification number, username, check-in time, and other such information in the application interface and can select the "Confirm Send" button on the application interface when he is ready to submit the input information to the business server. Because the client device in this embodiment is not sending the information over the voice communication link but instead over a data network, the client device does not need to translate the information input by the user into sound-based signals. The client device can send the information entered by the user directly to the hotel server (e.g., as one or more data packets) over the data network. After the hotel server receives the information sent by the user, it can complete the room reservation transaction based on the user input information.

While the client device and the business server may send and receive information over either the voice communication link or the data network, in some embodiments, the client device and the business server may send and receive information over one or both of the voice communication link or the data network. For example, the client device may flexibly select to use one or both of the voice communication link and the data network on which to send information exchanged based on one or more factors such as, for example, the availability of either the voice communication link or the data network or the reliability of the voice communication link or the data network.

In some embodiments, in response to receiving a submission of user input information at the hotel server via the designated application, the hotel server may solicit for further information or a resubmission of information by sending another command to the client device that would cause different prompts to be displayed at the user interface of the designated application. The client device and the business server may proceed to transfer and receive (exchange) information in the manner described above where the user interface of the designated application prompts the user for information, the user inputs information into the user interface, and the information is transmitted to the business server without the business server needing to play back audio prompts over the voice communication link.

Unlike conventional techniques in which a user needs to complete a transaction or other request entirely through an automated phone menu system, the embodiments described herein automatically trigger a designated application corresponding to a particular business service to be launched at the client device and enable a user to complete the desired transaction or request based on inputting information into the user interface of the application. The user interface of the application interface may comprise input fields into which the user may input information using a keypad or keyboard of the client device and values input using the input areas are much easier to edit/correct than inputting values in response to the conventional automated phone menu system. Whereas in the conventional automated phone menu system, the user must listen through one or more audio recording messages, wait to input information at the right times, and confirm whether previously input information is correct or needs to be re-entered, the embodiments described within enable a user to easily input and revise only the incorrect values (instead of re-entering entire sets of values) into a user interface without waiting for audio prompts. The user would not need to rely on being able to clearly hear all of each audio recording to be able to know which values to enter, which greatly improves efficiency.

In some embodiments, some data to be input into the input areas of the user interface of the designated application may be pre-stored at the client device. Then when the designated application is launched, the pre-stored values that are associated with the input areas of the application's user interface are used to prepopulate those input areas. Using pre-stored data to prepopulate at least some input areas of the user interface of a designated application may save the user time in submitting information to the business server. In some embodiments, once the input areas of the user interface are prepopulated, such information is directly sent to the business server without requiring further action from the user. In some other embodiments, once the input areas of the user interface are prepopulated, the input fields with the prepopulated values are first presented to the user so that the user may edit or revise any of the prepopulated values and select the control that sends the information to the business server. For example, pieces of data with metadata that indicates their respective input areas may include the user's identification number, name, username, and other such user information. For example, the pre-stored data may be data previously input by the user at their corresponding input areas in a previous use of the designated application and stored.

To complete a payment transaction with a business server (e.g., for a payment-type business service), a user typically needs to send credit (or debit) card information (e.g., a name associated with the credit card and a number associated with the credit card) to the business server so that the business server can charge an amount of money on the credit card. While not all business services require payments, some business services may in order to complete a transaction. However, sending information from a client device to a business server is not usually very secure and therefore puts the account associated with the credit card number at risk of malicious activity. To increase security in making a payment transaction using the designated application, in some embodiments, a user input or prepopulated credit card number (e.g., or other financial transaction information such as a debit card number or bank account number) in the user interface of the launched designated application is not sent to the business server with other user input or prepopulated information. Instead, the client device (e.g., as caused by the launched designated application) invokes a secure payment process over a separate application (e.g., a secured application associated with banking) or a web browser application (e.g., which is directed to a web page associated with banking). For example, after the client device sends information other than the credit card number to the business server, the business server returns payment information to the client device. The payment information that is sent back by the business server may include, but is not limited to, user information associated with the user, a type of business information associated with the business server, and information regarding the amount due. For example, the client device may input or send the payment information received from the business server to the invoked banking application or the invoked banking web page so that the banking application or banking web page may complete the transaction using their respective secured means. By allowing a separate application or web page to complete a payment transaction from the user to the business server instead of sending the credit card information to the business server itself, the security of the user's financial information is improved.

In exchanging information with a hotel server, assume that the room reservation business service requires a payment (e.g., a deposit on the room booked) to complete the transaction. Therefore, a room reservation business service is a payment-type business service. Assume that in this example, the designated application corresponding to the room reservation business service has launched but the user input and/or prepopulated information has not yet been sent to the business server. In this example, assume that information other than the credit card information (e.g., a username, an identification number, check-in time, etc.) is user input and/or prepopulated into the appropriate input areas of the user interface of the designated application. After the hotel server receives the information sent by the client device, the hotel server generates the payment information associated with the room reservation request and sends the payment information to the client device. For example, the payment information may include information associated with the room reservation request (e.g., the user information, the check-in time, the type of business service, an amount payable) needed to complete the room reservation and payment transaction. The client device may use the payment information received from the hotel server with the user's input or pre-stored credit card information to complete the payment via a secured process using a separate application at the client device.

Figure 4:
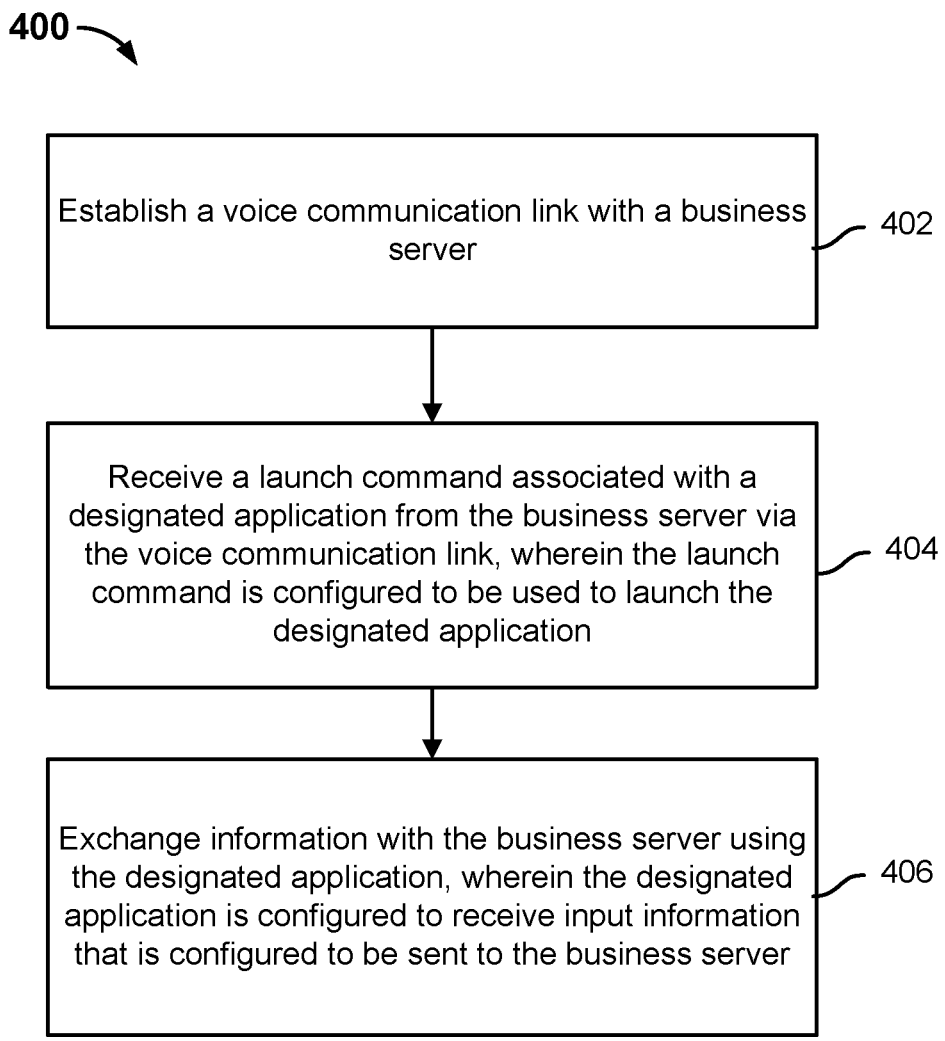
FIG. 4 is a flow diagram showing an embodiment of a process for exchanging information with a business server.

FIG. 4 is a flow diagram showing an embodiment of a process for exchanging information with a business server. In some embodiments, process 400 is implemented at client device 202 of system 200 of FIG. 2.

At 402, a voice communication link is established with a business server. As described above with 302 of process 300 of FIG. 3, a user using the client device may initiate the voice communication link, in some embodiments, by using a telephone functionality running on the device to call a telephone number associated with the business server.

At 404, a launch command associated with a designated application is received from the business server via the voice communication link, wherein the launch command is configured to be used to launch the designated application. As described above with 304 of process 300 of FIG. 3, one or more designated applications may be running on the client device. Each designated application may be associated with a particular business service and/or business server. After the voice communication link has been established, the business server sends a launch command corresponding to a particular designated application to the client device.

The client device may analyze the launch command (e.g., by using an application that decodes and/or translates the launch command) to determine a set of values. For example, each designated application is also associated with a particular launch command and data associating each designated application and a corresponding launch command (e.g., the corresponding set of values) is stored at the client device. Thus, the client device may use the stored data associating each designated application with a corresponding launch command to determine the designated application that is associated with the received launch command.

Once the designated application corresponding to the received launch command has been received, the client device launches that designated application. In some embodiments, launching the designated application includes opening the designated application, running the designated application, and/or presenting a user interface of the designated application at the client device.

At 406, information is exchanged with the business server using the designated application, wherein the designated application is configured to receive input information that is configured to be sent to the business server.

As described above with 306 of process 300 of FIG. 3, the user interface of the launched designated application may include messages that prompt the user to input information into one or more input areas. In some embodiments, prestored data at the client device may be used to prepopulate at least some input areas of the user interface and the user may have an opportunity to revise the prepopulated information prior to sending it to the business server. In some embodiments, to send the user input or prepopulated information of the designated application to the business server, the user may select a certain control (e.g., a "Confirm Send" button) on the user interface of the designated application and the client device may be triggered to send the information to the business server. In some embodiments, the client device may send the information over one or both of the voice communication link and a data network. In the event that the client device selects to send information over the voice communication link, the client device is configured to first translate the information into a format (e.g., a set of signals) that may be transmitted over the voice communication link.

In response to receiving a set of information from the client device, the hotel server may send information (e.g., over either one or both of the voice communication link and a data network) to the client device that will update the user interface of the designated application and prompt the user to input more information into the user interface of the designated application at the client device to be sent back to the hotel server. The client device and the business server may continue to exchange information in this manner until a desired transaction is complete and/or one of the client device and the business server desires to end the exchange of information.

Figure 5:
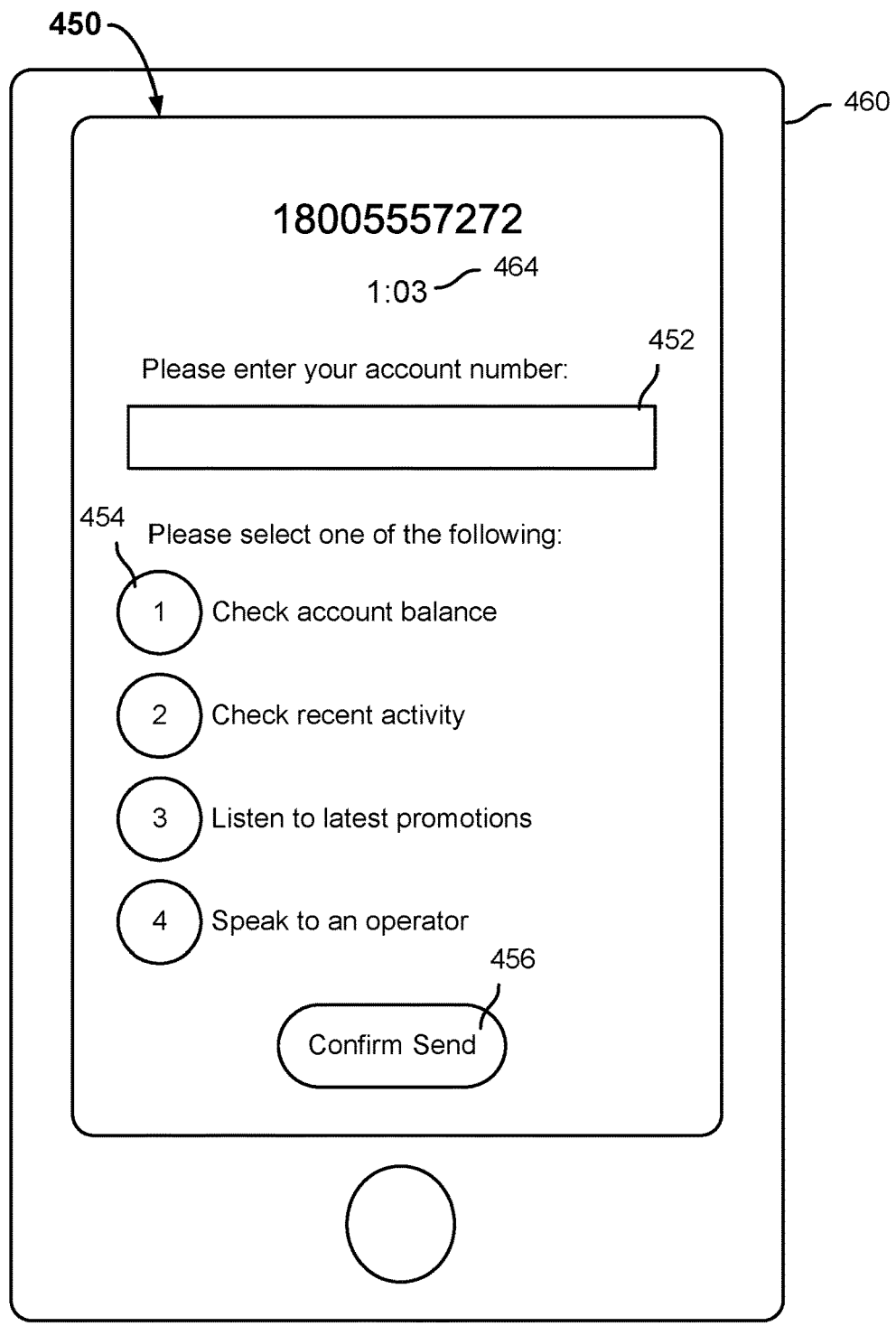
FIG. 5 is a diagram showing an example of a user interface of a designated application.

FIG. 5 is a diagram showing an example of a user interface of a designated application. In the example, user interface 450 belongs to a designated application that was launched in response to a launch command being received at client device 460. User interface 450 may be displayed at a touchscreen of client device 460. For example, a user using client device 460 had called a phone number associated with customer service for a bank, the call was received by a business server associated with the bank, and the business server had established a voice communication link with client device 460. In the example, the number dialed ("18005557272") by the user is presented at user interface 450 as well as a timer 464 associated with the duration of time (e.g., 1:03 minutes) since the voice communication link was established with the bank business server. The business server had sent back to client device 460 a launch command (e.g., as one or more signals) over the voice communication link. In response to receiving the launch command, client device 460 (and/or a software running on the client device 460) analyzed the launch command to determine a set of values that matched a banking service designated application, which is subsequently launched at client device 460. User interface 450 is an example user interface for the launched banking service designated application.

User interface 450 solicits the user for information through character input (e.g., input area 452) as well as a user selection from among multiple options (e.g., button 454 is such an option). Conventionally, after a user has called a customer service phone line of a business service, the user needs to listen to at least part of a recording describing a menu (e.g., "Please input your account number and then press the '#' key"). Whereas described herein, a user may learn about what information to provide and/or which options to choose from by simply viewing the user interface of the designated application. In this example, a user is asked to input an account number at input area 452 and make a selection from a menu that includes various options, such as option 1 "Check account balance," option 2 "Check recent activity," option 3 "Listen to latest promotions," and option 4 "Speak to an operator." The user may input values using, for example, an onscreen keyboard of client device 460, or by interacting with the touchscreen directly. Once the user has input the appropriate values and selection at user interface 450, the user may select "Confirm Send" button 456. In response to the user selecting the "Confirm Send" button 456, the user input information and/or selection is to be sent to the business server over one or both of the voice communication link and a data network.

Figure 6:
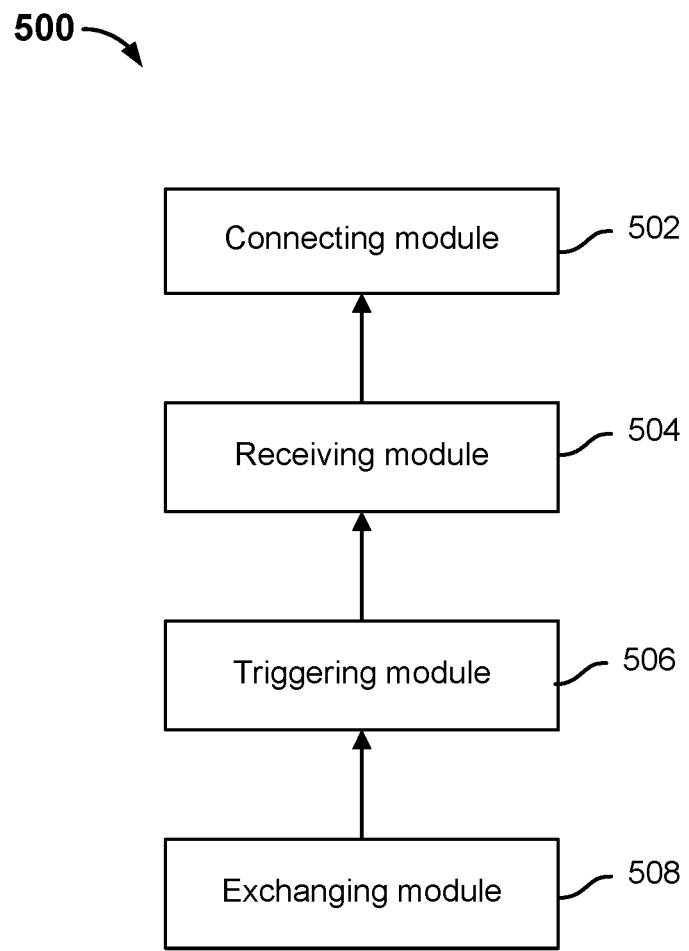
FIG. 6 is a diagram showing an embodiment of a system for exchanging information.

FIG. 6 is a diagram showing an embodiment of a system for exchanging information. In some embodiments, system 500 comprises a client device. In the example, system 500 includes connecting module 502, receiving module 504, triggering module 506, and exchanging module 508.

The modules can be implemented as software components executing on one or more processors, as hardware such as programmable logic devices and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

Connecting module 502 is configured to establish a voice communication link with a business server.

Receiving module 504 is configured to receive a launch command corresponding to a designated application and that was sent back by the business server based at least in part on the voice communication link. In some embodiments, the launch command received by receiving module 504 comprises one or more signals. For example, the one or more signals may comprise dual-tone multi-frequency signals or audio signals.

Triggering module 506 is configured to launch the designated application according to the launch command that was received. In some embodiments, triggering module 506 is configured to analyze the one or more signals associated with the launch command to determine a set of values. For example, triggering module 506 is configured to analyze the one or more signals associated with the launch command in a manner associated with the format of the signals. For example, in the event that the signals were dual-tone multi-frequency signals, triggering module 506 is configured to use stored data mapping the association between various dual-tone multi-frequencies to various corresponding values to determine the set of values. In another example, in the event that the signals were audio signals, triggering module 506 is configured to use a predetermined translation technique to determine the set of values.

Exchanging module 508 is configured to exchange information with the business server via the designated application. In some embodiments, exchanging module 508 is configured to exchange information with the business server via the designated application over one or both of the voice communication link or a data network. In some embodiments, prior to using exchanging information with the business server over the data network, exchanging module 508 is configured to end the established voice communication link with the business server. In some embodiments, exchanging module 508 is configured to send user information either input by the user or prepopulated into the user interface of the designated application to the business server, receive payment information sent back by the business server, and perform payment operations via the designated application using the payment information.

Figure 7:
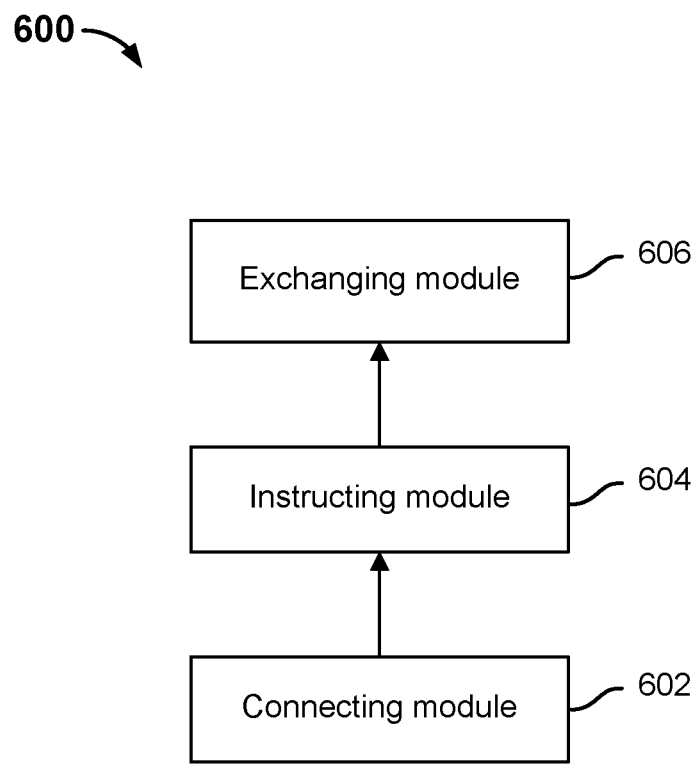
FIG. 7 is a diagram showing an embodiment of a system for exchanging information.

FIG. 7 is a diagram showing an embodiment of a system for exchanging information. In some embodiments, system 600 is implemented as a business server. In the example, system 600 includes exchanging module 606, instructing module 604, and connecting module 602.

Connecting module 602 is configured to establish a voice communication link with a client device.

Instructing module 604 is configured to send a launch command corresponding to a designated application over the voice communication link. The launch command is configured to cause the designated application corresponding to the launch command to be launched at the client device. In some embodiments, instructing module 604 is configured to send the launch command as one or more signals over the voice communication link.

Exchanging module 606 is configured to exchange information with the client device via the designated application.

A person skilled in the art should understand that the embodiments of the present application can be provided as methods, systems or computer software products. Therefore, the present application can take the form of embodiments consisting entirely of hardware, embodiments consisting entirely of software, and embodiments which combine software and hardware. In addition, the present application can take the form of computer program products implemented on one or more computer-operable storage media (including but not limited to magnetic disk storage devices, CD-ROMs, and optical storage devices) containing computer operable program codes.

The present application is described with reference to flow charts and/or block diagrams based on methods, equipment (systems) and computer program products. It should be understood that each process and/or block in the flow charts and/or block diagrams, and combinations of processes and/or blocks in the flow charts and/or block diagrams, can be achieved through computer program commands. One can provide these computer commands to a general-purpose computer, a specialized computer, an embedded processor or the processor of other programmable data processing equipment so as to give rise to a machine, with the result that the commands executed through the computer or processor of other programmable data processing equipment give rise to a device that is used to realize the functions designated by one or more processes in a flow chart and/or one or more blocks in a block diagram.

These computer program commands can also be stored on specially-operating computer-readable storage devices that can guide computers or other programmable data processing equipment, with the result that the commands stored on these computer-readable storage devices give rise to products that include command devices. These command devices realize the functions designated in one or more processes in a flow chart and/or one or more blocks in a block diagram.

These computer program commands can also be loaded onto a computer or other programmable data processing equipment, with the result that a series of operating steps are executed on a computer or other programmable equipment so as to give rise to computer processing. In this way, the commands executed on a computer or other programmable equipment provide steps for realizing the functions designated by one or more processes in a flow chart and/or one or more blocks in a block diagram.

Although preferred embodiments of the present application have already been described, a person skilled in the art can make other modifications or revisions to these embodiments once he grasps the basic creative concept. Therefore, the attached claims are to be interpreted as including the preferred embodiments as well as all modifications and revisions falling within the scope of the present application.

Obviously, a person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A server, comprising:
   one or more processors configured to:
      receive from a client device a request to establish a voice communication link associated with a specified service, wherein a designated application corresponding to the specified service is installed on the client device, and wherein the designated application is a special-purpose application configured to provide the specified service;
      in response to the request, establish the voice communication link with the client device;
      identify a launch command associated with the designated application to be executed on the client device;
      translate the launch command associated with the designated application into a set of audio-based signals;
      transmit the set of audio-based signals over the voice communication link to the client device for the client device to, upon receiving the set of audio-based signals:
         translate the set of audio-based signals into a set of values;
         determine that the set of values corresponds to the designated application; and
         launch the designated application on the client device; and
      exchange information with the client device through the designated application, including by receiving at least a portion of the information, from the client device, over a data link that is different from the voice communication link; and
   one or more memories coupled to the one or more processors and configured to provide the one or more processors with instructions.

2. The server of claim 1, wherein the set of audio-based signals comprises one or more dual-tone multi-frequency signals.

3. The server of claim 1, wherein the client device translates the set of audio-based signals into the set of values by comparing the set of audio-based signals to stored data indicating correspondences between a plurality of audio-based signals and a plurality of values to determine the set of values.

4. A method, comprising:
   receiving from a client device a request to establish a voice communication link associated with a specified service, wherein a designated application corresponding to the specified service is installed on the client device, and wherein the designated application is a special-purpose application configured to provide the specified service;
   in response to the request, establishing the voice communication link with the client device;
   identifying a launch command associated with the designated application to be executed on the client device;
   translating the launch command associated with the designated application into a set of audio-based signals;
   transmitting the set of audio-based signals over the voice communication link to the client device for the client device to, upon receiving the set of audio-based signals:
      translate the set of audio-based signals into a set of values;
      determine that the set of values corresponds to the designated application; and
      launch the designated application on the client device; and
   exchanging information with the client device through the designated application, including by receiving at least a portion of the information, from the client device, over a data link that is different from the voice communication link.

5. The method of claim 4, wherein the set of audio-based signals comprises one or more dual-tone multi-frequency signals.

6. The method of claim 4, wherein the client device translates the set of audio-based signals into the set of values by comparing the set of audio-based signals to stored data indicating correspondences between a plurality of audio-based signals and a plurality of values to determine the set of values.

7. A device, comprising:
   one or more processors configured to:
      send to a server a request to establish a voice communication link associated with a specified service, wherein a designated application corresponding to the specified service is installed on the device, and wherein the designated application is a special-purpose application configured to provide the specified service;
      establish the voice communication link with the server;
      receive a set of audio-based signals associated with a launch command at the device, wherein the set of audio-based signals is transmitted over the voice communication link, wherein the launch command is identified by the server as associated with the designated application to be executed on the device;
      in response to the receipt of the set of audio-based signals:
         translate the set of audio-based signals into a set of values;
         determine that the set of values corresponds to the designated application; and
         launch the designated application on the device; and exchange information with the server through the designated application, including by transmitting at least a portion of the information to the server over a data link that is different from the voice communication link; and one or more memories coupled to the one or more processors and configured to provide the one or more processors with instructions.

8. The device of claim 7, wherein the set of audio-based signals comprises one or more dual-tone multi-frequency signals.

9. The device of claim 7, wherein the one or more processors are further configured to, in response to the receipt of the set of audio-based signals, translate the set of audio-based signals into the set of values by comparing the set of audio-based signals to stored data indicating correspondences between a plurality of audio-based signals and a plurality of values to determine the set of values.

10. The device of claim 7, wherein to exchange information with the server through the designated application includes to:

receive input information via one or more input areas associated with a user interface of the designated application; and convert the input information into one or more signals prior to sending the one or more signals to the server.

11. A method, comprising:

sending from a client device to a server a request to establish a voice communication link associated with a specified service, wherein the client device has installed a designated application corresponding to the specified service, and wherein the designated application is a special-purpose application configured to provide the specified service;

establishing the voice communication link with the server;

receiving a set of audio-based signals associated with a launch command at a device, wherein the set of audio-based signals is transmitted over the voice communication link, wherein the launch command is identified by the server as associated with the designated application to be executed on the client device;

in response to the receipt of the set of audio-based signals:
translating the set of audio-based signals into a set of values;
determining that the set of values corresponds to the designated application; and
launching the designated application on the client device; and exchanging information with the server through the designated application, including by transmitting at least a portion of the information, to the server, over a data link that is different from the voice communication link.

12. The method of claim 11, wherein the set of audio-based signals comprises one or more dual-tone multi-frequency signals.

13. The method of claim 11 further comprising, in response to the receipt of the set of audio-based signals, translating the set of audio-based signals into the set of values by comparing the set of audio-based signals to stored data indicating correspondences between a plurality of audio-based signals and a plurality of values to determine the set of values.

14. The method of claim 11, wherein exchanging information with the server through the designated application includes:

receiving input information via one or more input areas associated with a user interface of the designated application; and converting the input information into one or more signals prior to sending the one or more signals to the server.

15. The server of claim 1, wherein the voice communication link is configured to transmit one or more audio-based signals between the server and the client device.

16. The device of claim 7, wherein the voice communication link is configured to transmit one or more audio-based signals between the server and the device.

17. The server of claim 1 wherein at least one of the one or more processors and the client device is configured to determine that the voice communication link should be ended and the data link should be used instead.

18. A server, comprising:

one or more processors configured to:

receive from a client device a request to establish a voice communication link associated with a specified service, wherein a designated application corresponding to the specified service is installed on the client device, and wherein the designated application is a special-purpose application configured to provide the specified service;

in response to the request, establish the voice communication link with the client device;

identify a launch command associated with the designated application to be executed on the client device;

translate the launch command associated with the designated application into a set of audio-based signals;

transmit the set of audio-based signals over the voice communication link to the client device for the client device to, upon receiving the set of audio-based signals:
translate the set of audio-based signals into a set of values;
determine that the set of values corresponds to the designated application; and
launch the designated application on the client device;

exchange information with the client device through the designated application; and transmit an additional command to the client device for causing different prompts to be displayed at a user interface of the designated application; and one or more memories coupled to the one or more processors and configured to provide the one or more processors with instructions.

19. The server of claim 18, wherein the one or more processors are further configured to transmit an additional command to the client device for causing the client device to launch an additional designated application.

* * * * *

UNITED STATES PATENT AND TRADEMARK OFFICE
CERTIFICATE OF CORRECTION

PATENT NO. : 10,404,849 B2
APPLICATION NO. : 15/195902
DATED : September 3, 2019
INVENTOR(S) : Chaofeng Meng et al.

It is certified that error appears in the above-identified patent and that said Letters Patent is hereby corrected as shown below:

In the Specification

In Column 5, Line 52, delete ""0," "1," "2," "3" "4," "5" "6," "7," "8," "9," "*" "#" "A," "B," "C," and "D."" and insert --"0," "1," "2," "3," "4," "5," "6," "7," "8," "9," "*," "#," "A," "B," "C," and "D."--, therefor.

In the Claims

In Column 15, Claim 1, Line 59, after "information", delete ",".

In Column 15, Claim 1, Line 60, after "device", delete ",".

In Column 16, Claim 4, Line 33, after "information", delete ",".

In Column 16, Claim 4, Line 33, after "device", delete ",".

In Column 17, Claim 11, Line 52, after "information", delete ",".

In Column 17, Claim 11, Line 52, after "server", delete ",".

Signed and Sealed this
Third Day of March, 2020

Andrei Iancu
*Director of the United States Patent and Trademark Office*